Jan. 5, 1932.

W. M. FROST

INSECT TRAP
Filed Dec. 12, 1927
Original Filed Dec. 12, 1927

Re. 18,313

Inventor
William M. Frost
By Herbert E. Smith
Attorney

Reissued Jan. 5, 1932 Re. 18,313

UNITED STATES PATENT OFFICE

WILLIAM M. FROST, OF SPOKANE, WASHINGTON, ASSIGNOR TO FROST ELECTRIC SCREEN CO., OF SPOKANE, WASHINGTON, A CORPORATION OF WASHINGTON

INSECT TRAP

Original No. 1,743,665, dated January 14, 1930, Serial No. 239,369, filed December 12, 1927. Application for reissue filed November 24, 1930. Serial No. 497,941.

My present invention relates to insect traps of the electrocuting type, and particularly to devices in which cage-like or grid-like electrodes of opposite polarity are so formed and positioned that insects coming into contact with the opposed electrodes will be electrocuted.

One of the principal objects of my invention is the provision of a device of this general character which will present relatively large surface areas of opposed electrodes combined with relatively narrow intervening passages, and which will produce unusually effective and satisfactory results in the trapping and electrocution of insects. These results are attained through the novel construction and arrangement of the parts of the device constituting my invention, and principally through the use of electrodes including spaced alternating blades. In its more specific aspects, my invention pertains to details of construction and arrangement of its parts, and particularly of the electrodes.

Devices constructed in accordance with the principles of my invention may be manufactured conveniently and at comparatively low cost, are of compact form and attractive appearance, possess great durability, and are capable of greatly increased efficiency.

The device illustrated as the preferred embodiment of my invention comprises a trap of cage-like form produced by electrodes of novel configuration and arrangement. This electrocuting cage-like trap is designed to be connected in a suitable manner to a source of current, usually through a conveniently located transformer, and is preferably attached to a support. In the particular embodiment illustrated, the support to which the electrocuting cage is attached is in the form of a housing for a transformer, and is adapted to be suspended in suitable locations either indoors or out of doors.

The nature of the invention and its several objects and advantages will be more clearly understood from the description and drawings, wherein I have disclosed an example of the various possible embodiments of the principles of my invention, and my preferred form of detailed construction.

Figure 1:
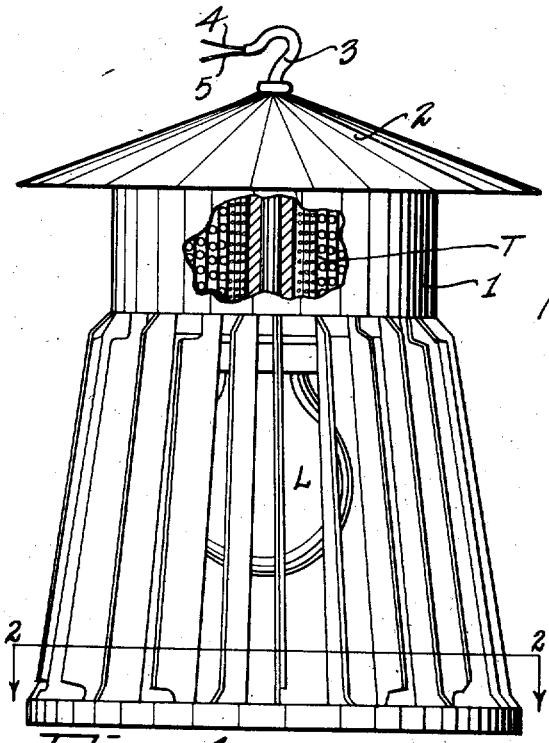
Figure 3:
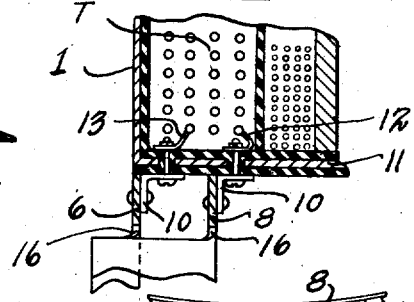
Figure 5:
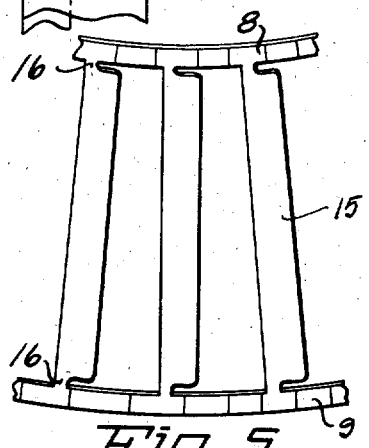
Figure 2:
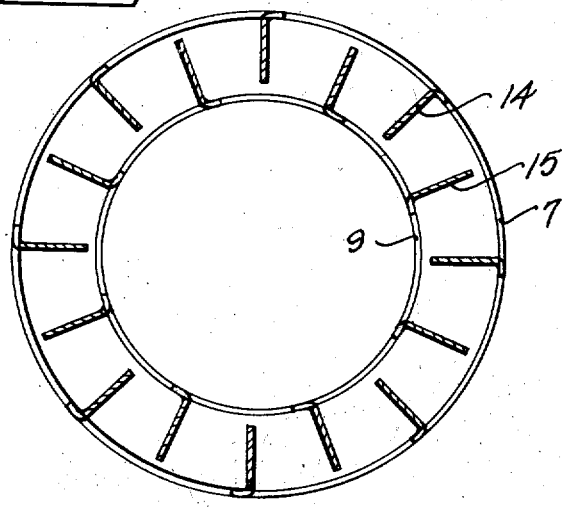
Figure 4:
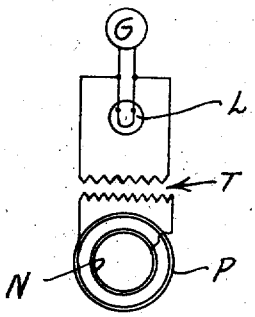

In the drawings, wherein like reference numerals refer to like parts in the several views, Figure 1 is a side elevational view of an electrocuting insect trap according to my invention, a portion being broken away to reveal the transformer in its preferred location, Figure 2 is a horizontal sectional view in the direction of the arrow on line 2—2 of Fig. 1, Figure 3 is an enlarged vertical sectional view of a portion of the transformer, transformer housing, and electrodes shown in Fig. 1, Figure 4 is a diagrammatic view of the electrical connections for the parts of the trap, and Figure 5 is a detail elevational view of a portion of one of the electrodes.

The device illustrated is essentially a cage or trap comprising a pair of cage-like electrodes including a plurality of blades, the blades 14 of one electrode being arranged in spaced alternating relation with the blades 15 of the other electrode. The blades are respectively attached at their ends to concentrically disposed rings or bands located at the opposite ends of the cage. In the preferred form of the device illustrated, the blades are disposed in vertical planes and connect upper and lower electrode rings or bands, blades 15 being attached to upper and lower inner rings or bands 8 and 9 and blades 14 to upper and lower outer rings or bands 6 and 7. The blades of the two electrodes extend respectively outwardly and inwardly with respect to the center of the trap, as shown in Fig. 2. The blades of each electrode are preferably made integral with the rings or bands which they connect, and are bent up or twisted as a whole about said rings or bands so as to extend in a radial direction relative to the center of the trap. Blades 15, which connect the inner rings or bands 8 and 9 to form one electrode N, which may be designated the negative, project between and overlap adjacent blades 14 of the opposite electrode P.

The cage-like electrodes, for convenience in handling and use, are attached to a support, which may be at the upper end of the electrodes and may take the form of a cylindrical housing 1 adapted to inclose a transformer T and surmounted by a conical overhanging top 2 provided with a suspending hook 3 of tubular form for the reception of wires 4 and 5 connecting the source of current to the transformer and to the lamp L.

The upper pair of electrode rings or bands 6 and 8 are preferably insulated from each other by a plate 11 of insulating material upon the bottom of housing or support 1, being attached to the plate by brackets 10 and electrically connected to the transformer through the brackets and their attaching screws and wires 13 and 12, respectively.

Connections may be made for supplying current of suitable voltage and opposite polarity from any suitable source (e. g. a generator G) to the respective electrodes P and N through the transformer T, as indicated in Fig. 4. In the transformer which I prefer to use, the magnet, the primary coil and the secondary coil are thoroughly insulated from each other and have no electrical connections. The transformer is combined with a trap in such manner that the terminals are connected to the alternately arranged electrodes of the trap, and the transformer not only transforms the current to a high frequency but also acts as a condenser or accumulator in building up the electrostatic charge on the electrodes which form a grid, and the energy or force in the grids is thus increased for the purpose of electrocuting or destroying insects that come in contact with two of the opposed electrodes.

The radial and alternately spaced arrangement of the electrode blades 14, 15 provides openings between adjacent blades which are wider at the outer than at the inner side of the trap. These openings may be of sufficient width to permit an insect to enter between the blades, but the latter, at their inner edges, are sufficiently close together to insure the electrocution of the insect through contact of its body or wings with opposed electrodes. The width and smooth flat faces of the blades render it impossible for insects to cling to them, as could be done, for instance, with wire electrode elements. Insects stunned by flying against the outer surface of the trap, or by the current, will fall into the trap and become electrocuted because of the outwardly extending part of the trap below. Even if insects were to reach the inside of the trap through its bottom without passing inwardly through the row of blades, they would in most instances be electrocuted by coming into contact with the edges or sides of opposed blades at the inner side of the trap while flying about within it. Whether approaching the electrode blades from within or from without, the insects when electrocuted will fall clear of the trap and may be collected in a pan suspended beneath the trap (not shown). This result is insured, not only by the use of smooth flat blades instead of wires, but also by the disposition of the electrodes vertically and edgewise. Moreover, electrodes P and N, and the cage-like trap formed thereby, are inclined inwardly. Also because of this upwardly tapered (e. g., frusto-conical) shape of the cage or trap, the opening between adjacent blades at their upper ends is narrower than the opening between the same blades at their lower ends. This added constriction of the passages between the blades is of advantage, particularly since it occurs in the part of the cage nearest the lure (lamp L) to which the insects will be attracted.

Attraction of insects by means of a lure of some sort placed within the trap is often desirable. The lure may be a lamp (adapted especially for night use) suitably supported within the cage and connected to the source of current, or it may be a bait (not shown). While the efficiency of my insect trap is generally increased by the use of a lure with it, my invention is complete and operative without the introduction of insect attracting devices or lure elements therein.

In the preferred manner of construction and use of my device, the electrodes, being supported only at their upper ends and being free and spaced apart at their lower ends, provide an open-ended trap, all exposed surfaces of which (bottom and interior, as well as exterior) constitute insect electrocuting surfaces, and through the open bottom of which electrocuted insects are free to drop out of the device.

The novel and important features of my invention will now be clearly understood. The advantages hereinbefore enumerated and explained, and particularly those derived from the use of wide, flat electrode blades, their manner of disposition in the device and their spaced alternating arrangement to form spaced concentric opposed electrodes of cage-like form, the structural features of the electrodes and their elements, and their manner of association with each other and with the housing, transformer and other parts of the device, are sufficiently apparent from the foregoing description and need not be explained further, particularly since the novel features which give rise to these advantages are pointed out and defined in the claims.

I claim:

1. The combination in an electrocuting insect trap with a housing and a transformer therein, of a trap portion below the housing comprising electrodes connected with the transformer, said electrodes including alternately spaced radially extending blades, and a lure within the trap.

2. The combination in an electrocuting trap with a transformer, a housing therefor, and an outspreading conical top for the housing, of a lower trap portion comprising a pair of upper concentric bands and a pair of lower concentric bands, and radially extending, alternately arranged, positive and negative blades connecting said bands.

3. The combination in an electrocuting insect trap with a supporting portion, of a pair of circular concentric bands attached to said support, a pair of lower circular concentric bands, and spaced radial blades connecting said upper and lower bands and forming alternately positive and negative electrodes.

4. The combination in an electrocuting insect trap with a supporting portion, of a pair of bands attached to said support, a second pair of bands spaced from the first-mentioned pair, each pair of bands being arranged one within the other, and spaced blades connecting said pairs of bands and forming alternately positioned positive and negative electrodes.

5. In an electric insect trap, a pair of electrodes, each comprising spaced radial blades, the blades of said electrodes being disposed in spaced alternating overlapping relation, and means for supporting said electrodes.

6. In an electric insect trap the combination with a support, of a trap portion comprising a pair of cage-like electrodes one within the other attached to said support, said electrodes including alternately spaced overlapping blades.

7. In an electric insect trap, the combination with a support, of a trap portion secured to said support and comprising electrodes to be supplied with current of opposite polarity, said electrodes including alternately spaced radially extending blades.

8. An electric insect trap comprising a support, and a pair of cage-like electrodes secured one within the other to the lower part of said support, said electrodes including alternately spaced blades to be supplied with current of opposite polarity, and means for supporting a lure within the trap.

9. An electric insect trap comprising a support, and a pair of cage-like electrodes attached at their upper ends to said support, said electrodes including spaced vertically incline radial blades alternately disposed in overlapping relation.

10. An electric insect trap comprising cage-like electrodes, one within the other, said electrodes including spaced alternately disposed radially extending blades.

11. An electric insect trap in the form of a cage comprising a support, and electrodes secured to said support, said electrodes including alternately spaced radially extending blades.

12. An electric insect trap comprising concentric electrodes, said electrodes including alternately spaced radially extending blades.

13. An electric insect trap comprising cage-like electrodes, one within the other, said electrodes including spaced alternately disposed blades and the blades of the inner electrode extending outwardly.

14. An electric insect trap comprising cage-like electrodes, one within the other, each of said electrodes including a plurality of spaced blades, the blades of the respective electrodes being disposed in spaced alternating overlapping relation.

15. An electric insect trap comprising cage-like electrodes, one within the other, each electrode comprising spaced blade-supporting members and a plurality of spaced blades respectively connecting said members, the blades of the respective electrodes being disposed in spaced alternating overlapping relation.

16. An electric insect trap in the form of a cage comprising a pair of spaced concentric rings at one end of the cage, a pair of spaced concentric rings at the opposite end of the cage, and alternately arranged positive and negative blades respectively connecting the pair of outer rings and the pair of inner rings.

17. An electric insect trap in the form of a cage comprising a pair of bands at one end of the cage disposed one within the other in spaced relation, a pair of spaced bands similarly arranged at the other end of the cage, and electrode blades respectively connecting the inner and outer bands.

18. An electric insect trap comprising a cage-like electrode formed of longitudinally spaced blade-supporting members, and spaced blades connecting said members, a second cage-like electrode formed of longitudinally spaced blade-supporting members and spaced connecting blades, one of said electrodes being disposed within the other with the blades of one electrode lying between and in spaced relation with the blades of the other electrode.

19. An electric insect trap comprising a pair of upwardly tapering cage-like electrodes, one within and insulated from the other, each electrode including blades and the blades of the respective electrodes being disposed in alternately spaced overlapping relation.

20. An electric insect trap comprising cage-like electrodes, one within the other, said electrodes including spaced alternately disposed blades, and the blades of the respective electrodes extending edgewise toward each other.

21. An electric insect trap comprising cage-like electrodes, one within the other, each electrode including spaced blades, and the blades of the respective electrodes extending in opposite directions into spaced overlapping relation.

22. An electric insect trap comprising cage-like electrodes disposed one within the other, and comprising spaced blade-supporting members connected by spaced blades, the blades being integral with said members and bent at an angle thereto, and the blades of one electrode being disposed in spaced alternating relation to the blades of the other electrode.

23. In an electric insect trap, the combination with a support, of cage-like electrodes located one within the other, each electrode being attached at one end to said support and open at its opposite end, said electrodes including alternately spaced positive and negative inwardly converging blades.

24. In an electric insect trap, the combination with a support, of cage-like electrodes located one within the other and attached to said support only at one end, said electrodes including alternately spaced positive and negative blades.

25. In an electric insect trap, the combination with a support, of cage-like electrodes located one within the other, each electrode being suspended from said support and open at one end, said electrodes including alternately spaced positive and negative blades, and a lure within the inner electrode.

26. An electric insect trap comprising concentrically arranged cage-like electrodes each including a series of spaced projecting members, the projecting members of one electrode extending in spaced relation between the projecting members of the other electrode.

27. An electric insect trap comprising concentrically arranged cage-like electrodes, each including a series of spaced projecting members, the projecting members of the respective electrodes extending in opposite directions into spaced overlapping relation.

28. An electric insect trap comprising a pair of tapering concentric cage-like electrodes, said electrodes including spaced blades disposed edgewise in spaced staggered relation.

29. An electric insect trap comprising cage-like electrodes one within the other, each electrode including spaced blades, the blades of one electrode extending between the blades of the other electrode in spaced relation.

30. An electric insect trap comprising cage-like electrodes one within the other, each electrode including spaced radial blades, the blades of the respective electrodes being arranged in spaced staggered relation.

31. An electric insect trap comprising a support and a pair of cage-like electrodes attached only at their upper ends to said support, said electrodes including upwardly inclined blades arranged in spaced alternating relation.

32. In an electric insect trap, the combination with a support, of a series of positive and negative blades attached at one end to said support and disposed in edgewise position about a common axis, the blades of one polarity being located in spaced staggered relation to the blades of opposite polarity.

33. An electric insect trap comprising cage-like electrodes, one within the other, said electrodes including spaced alternately disposed blades converging inwardly.

34. An electric insect trap comprising cage-like electrodes, one within the other, each of said electrodes including spaced blades, the blades of one electrode being disposed in spaced alternating relation to the blades of the other electrode.

35. An electric insect trap comprising cage-like electrodes, one within the other, each of said electrodes including spaced radial blades, the blades of the respective electrodes being arranged in spaced staggered relation.

36. An electric insect trap comprising a pair of tapering cage-like electrodes one within the other, said electrodes including spaced blades disposed in spaced alternating relation.

WILLIAM M. FROST.